(12) United States Patent
Maehara

(10) Patent No.: US 7,287,440 B1
(45) Date of Patent: Oct. 30, 2007

(54) TORQUE SENSOR

(75) Inventor: Hideo Maehara, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 11/679,183

(22) Filed: Feb. 27, 2007

(30) Foreign Application Priority Data

Mar. 13, 2006 (JP) .............................. 2006-067355

(51) Int. Cl.
*G01L 3/14* (2006.01)
(52) U.S. Cl. ................................................ 73/862.322
(58) Field of Classification Search ............ 73/862.332
See application file for complete search history.

(56) References Cited

U.S. PATENT DOCUMENTS

| | | | |
|---|---|---|---|
| 6,880,411 B2 * | 4/2005 | Nakane et al. | 73/862.331 |
| 6,928,887 B2 * | 8/2005 | Nakane et al. | 73/862.331 |
| 6,988,422 B2 * | 1/2006 | Sugimura et al. | 73/862.334 |
| 7,047,824 B2 * | 5/2006 | Nakane et al. | 73/862.331 |
| 7,051,602 B2 * | 5/2006 | Nakane et al. | 73/862.333 |
| 7,089,809 B2 * | 8/2006 | Nakane et al. | 73/862.331 |
| 7,246,531 B2 * | 7/2007 | Nakane et al. | 73/862.332 |

FOREIGN PATENT DOCUMENTS

| | | |
|---|---|---|
| JP | 1994-11402 A | 1/1994 |
| JP | 3094049 B2 | 10/2000 |

\* cited by examiner

*Primary Examiner*—Michael Cygan
*Assistant Examiner*—Octavia Davis
(74) *Attorney, Agent, or Firm*—Hiroe & Associates; Michael L. Crapenhoft

(57) ABSTRACT

A magnetism generation portion 4 is provided at a first shaft 2, and a first magnetic yoke 7 and a second magnetic yoke 8 bent in L shape are provided at a second shaft 3 so that a magnetic flux generated at the magnetism generation portion 4 can be detected on the outer circumference side of the second shaft 3, and a magnetism detecting device for detecting the magnetic flux can be provided on the outer circumference side of the second shaft.

4 Claims, 7 Drawing Sheets

TORQUE SENSOR

BACKGROUND OF THE INVENTION

The present invention relates to a torque sensor suitable for use in a power steering device.

FIGS. 9 to 12 show a construction of a torque sensor 100 of a conventional art (shown in Patent Document 1, for example). FIG. 9 is a perspective view in the vicinity of the torque sensor. FIG. 10 is a partially enlarged view of FIG. 9. FIGS. 11 and 12 are diagrams for explaining the action.

[Patent Document 1] Patent No. 3094049

In FIG. 9, the torque sensor 100 is provided between a first shaft 101 and a second shaft 102. At the first shaft 101, a magnetism generation portion 103 for outputting a magnetic flux is provided. The magnetism generation portion 103 has a plurality of magnets 104 provided in the circumferential direction around the first shaft 101. The magnets 104 are magnetized toward the axis core direction (arrow direction) of the first shaft 101 and the adjoining magnets 104 are magnetized in the direction opposite to each other, and thus, when the magnetism generation portion 103 is seen from the second shaft 102 side, as shown in FIG. 10, magnetic poles different from each other are adjoined. That is, S poles and N poles are arranged alternately.

As shown in FIG. 9, the second shaft 102 is provided with an outer ring 105 and an inner ring 106, and as shown in FIG. 10, a plurality of outer magnetic path pieces 107 are extended from the outer ring 105, while inner magnetic path pieces 108 are extended from the inner ring 106. As shown in FIG. 10, a clearance 109 is provided between the outer ring 105 and the inner ring 106, and a magnetic sensor 110 is arranged in the clearance 109.

Next, action will be described. Suppose that a driver does not steer a steering wheel. In this case, since the first shaft 101 is not rotated with respect to the second shaft 102, as shown in FIG. 11, each outer magnetic path piece 107 is opposed to the N pole and the S pole of the magnet 104 over the same area each, and each inner magnetic path piece 108 is similarly opposed to the N pole and the S pole of the magnet 104 over the same area each. In this case, the magnetic flux is not guided to the outer magnetic path piece 107 and the inner magnetic path piece 108, and the magnetic flux outputted from the N pole of the magnet 104 is inputted to the S pole of the magnet 104. Therefore, the magnetic flux sensor 110 does not detect the magnetic flux.

Next, suppose that the driver has steered the steering wheel. In this case, the first shaft 101 is rotated with respect to the second shaft 102, and as shown in FIG. 12, the outer magnetic path piece 107 is moved to the S pole side, while the inner magnetic path piece 108 is moved to the N pole side. In this case, since the magnetic flux outputted from the N pole of the magnet 104 reaches the S pole of the magnet 104 via the inner magnetic path piece 108, the inner ring 106, the magnetic sensor 110, the outer ring 105, and the outer magnetic path piece 107, a rotation amount of the first shaft 101 with respect to the second shaft 102, that is, a steering torque of the steering wheel can be detected based on the magnetic flux amount detected by the magnetic sensor 110.

In the above-mentioned background art, since the torque sensor 100 is in the structure that it is provided between the first shaft 101 and the second shaft 102 in the axial direction, the entire length is long in the axial direction due to a space in which the torque sensor 100 is arranged. Thus, the torque sensor 100 which can be accommodated in the compact manner in the axial direction has been in demand.

The present invention was made in view of the problems of the background art and has an object to provide a torque sensor which can reduce the length in the axial direction when it is attached to two shafts whose torque is to be detected.

SUMMARY OF THE INVENTION

The present invention is a torque sensor comprising a housing, a first shaft and a second shaft accommodated in the housing and connected coaxially by a torsion bar, and a magnetism generation portion attached to the first shaft so as to surround the outer circumference of the first shaft and outputting a magnetic flux in the axis core direction of the first shaft, in which a plurality of magnetic yoke portions comprising a first magnetic yoke and a second magnetic yoke for guiding the magnetic flux outputted from the magnetism generation portion are attached to the second shaft; and a torque between the first shaft and the second shaft is detected magnetically by a magnetic sensor through detection of the magnetic flux in a magnetic gap between the first magnetic yoke and the second magnetic yoke, wherein the first magnetic yoke and the second magnetic yoke have their one end opposed to the magnetism generation portion, respectively, and the first magnetic yoke and the second magnetic yoke are bent in the L shape in the middle and extended in the direction crossing the axis core of the second shaft, respectively, and the other ends of the first magnetic yoke and the second magnetic yoke are provided separately from each other in the axis core direction on the outer circumference side of the second shaft;

the other ends of the first magnetic yokes of each magnetic yoke portion are connected to each other by a first magnetic ring;

the other ends of the second magnetic yokes of each magnetic yoke portion are connected to each other by a second magnetic ring; and the magnetic sensor is provided in the magnetic gap between the first magnetic ring and the second magnetic ring.

According to the present invention, since it is so constructed that the magnetic flux outputted from the magnetism generation portion is guided outward in the radial direction of the shaft so that change in the magnetic flux with change of a steering torque of a steering wheel is detected on outside in the radial direction of the shaft, a magnetism detecting device provided with a magnetic sensor can be arranged outside in the radial direction of the shaft and the construction can be formed with compact length in the axial direction.

DETAILED DESCRIPTION OF EXAMPLE EMBODIMENTS

Figure 1:
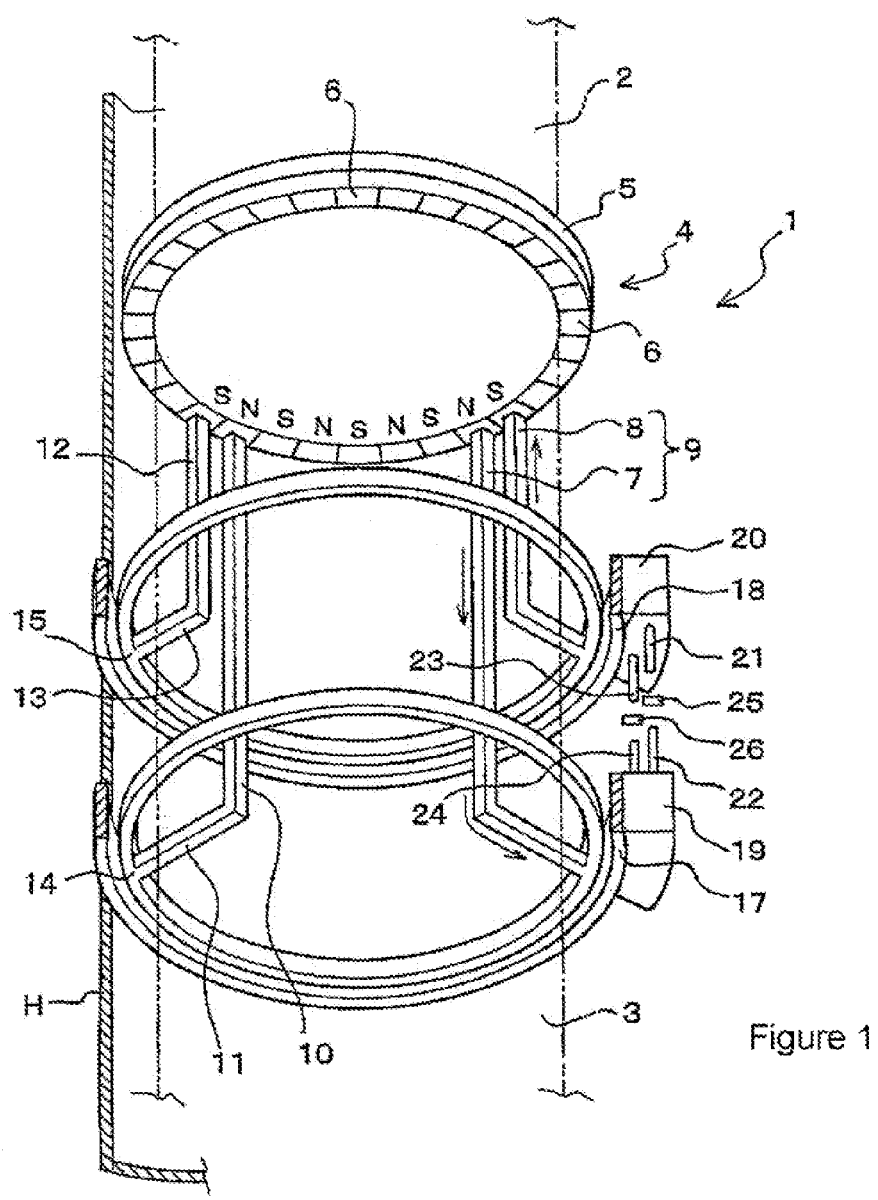
FIG. 1 is a view showing the principle of the present invention.

A principle of the present invention will be described based on the attached drawings. FIG. 1 explains an example used when a torque sensor 1 of the present invention is applied to an electric power steering device for detecting a torque between an input shaft 2 and an output shaft 3. The input shaft 2 and the output shaft 3 are stored in a housing H.

To the input shaft 2, a steering force is given by the steering wheel. The output shaft 3 gives a steering assisting force to the steered system side. The input shaft 2 and the output shaft 3 are connected to each other by a torsion bar.

At the input shaft 2, a magnetism generation portion 4 is provided. The magnetism generation portion 4 is in the structure that a magnet portion 6 is provided at a back yoke 5 formed by an annular magnetic body. The magnet portion 6 is formed by magnetizing the magnetic body toward the axis core direction of the input shaft 2 and in the circumferential direction, it is magnetized so that N poles and S poles are arranged alternately as shown in FIG. 1.

At the output shaft 3, a magnetic yoke portion 9 constructed by a first magnetic yoke 7 and a second magnetic yoke 8 are provided. The magnetic yoke portion 9 is provided on the outer circumference of the output shaft 3 in plural toward the circumferential direction. The first magnetic yoke 7 is formed by a straight portion 10 and a crossing portion 11 crossing the straight portion 10 and bent in the L shape. The straight portion 10 of the first magnetic yoke 7 is provided along the axial direction, and one end of the first magnetic yoke 7 is faced with the magnet portion 6. Also, the crossing portion 11 of the first magnetic yoke 7 is provided in the radial direction, while the other end of the first magnetic yoke 7 is faced outward in the radial direction of the output shaft 3.

Also, the second magnetic yoke 8 is formed by a straight portion 12 and a crossing portion 13 crossing the straight portion 12 and bent in the L shape. The straight portion 12 of the second magnetic yoke 8 is provided along the axial direction, and one end of the second magnetic yoke 8 is faced with the magnet portion 6. Also, the crossing portion 13 of the second magnetic yoke 8 is provided in the radial direction, while the other end of the second magnetic yoke 7 is faced outward in the radial direction of the output shaft 3. The other end of the first magnetic yoke 7 and the other end of the second magnetic yoke 8 are separated from each other in the axis core direction of the output shaft 3.

The other ends of the first magnetic yokes 7 of each magnetic yoke portion 9 are connected to each other by a first magnetic ring 14, while the other ends of the second magnetic yokes 8 of each magnetic yoke portion 9 are connected to each other by a second magnetic ring 15.

Outside the first magnetic ring 14, a first magnetism collecting ring 17 is provided on the inner surface of the housing H so as to surround the first magnetic ring 14. The magnetism collecting ring 17 is formed by a magnetic body and constitutes a part of a magnetic circuit. The first magnetism collecting ring 17 is in the shape that a plate material is bent in an annular state. The width in the axial direction of the first magnetism collecting ring 17 is formed larger than the width in the axial direction of the first magnetic ring 14. Also, outside the second magnetic ring 15, a second magnetism collecting ring 18 is provided on the inner surface of the housing H so as to surround the second magnetic ring 15. The second magnetism collecting ring 18 is formed by a magnetic body and constitutes a part of the magnetic circuit. The second magnetism collecting ring 18 is in the shape that a plate material is bent in the annular state. The width in the axial direction of the second magnetism collecting ring 18 is formed larger than the width in the axial direction of the second magnetic ring 15.

A first magnetism collecting yoke 19 is provided at the first magnetism collecting ring 17, while a second magnetism collecting yoke 20 is provided at the second magnetism collecting ring 18. At the first magnetism collecting yoke 19 and the second magnetism collecting yoke 20, two pairs of projections 21, 22, 23, 24 are provided so that they are opposed to each other. A magnetic gap is formed between each pair of projections 21, 22, 23, 24, and magnetic sensors 25, 26 are arranged in the magnetic gaps. A magnetic gap forming portion is constructed by the first magnetism collecting yoke 19, the second magnetism collecting yoke 20, the pairs of projections 21, 22, 23, 24.

Next, action will be described. In the state where the steering wheel is not steered, as shown in FIG. 2, the centers of one ends of the first magnetic yoke 7, the second magnetic yoke 8 are located at the boundary between the N pole and the S pole with each one end extending over the N pole and the S pole of the magnet portion 6 so that each one end is faced with the N pole and the S pole by the same area.

Figure 2:
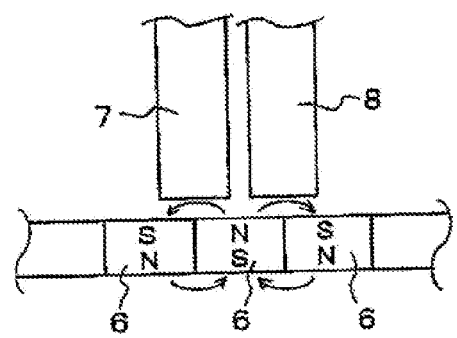
FIG. 2 is a diagram for explaining action.

As shown in FIG. 2, in this state, the magnetic flux outputted from the N pole is not guided by the first magnetic yoke 7 and the second magnetic yoke 8 but inputted to the S pole of the magnet portion 6. Therefore, the magnetic sensors 25, 26 shown in FIG. 1 do not detect the magnetic flux.

Figure 3:
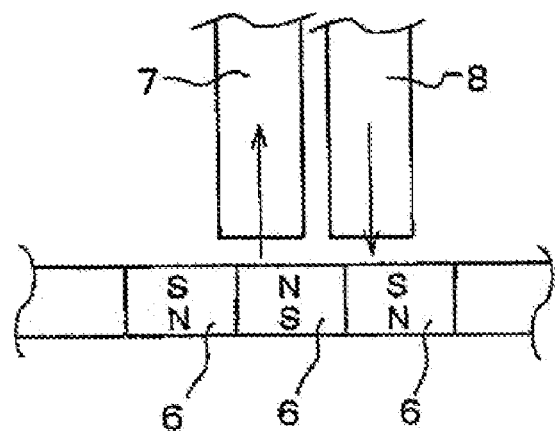
FIG. 3 is a diagram for explaining action.

Next, suppose that the driver steers the steering wheel. In this case, since the input shaft 2 is rotated with respect to the output shaft 3, as shown in FIG. 3, the center of one end of the first magnetic yoke 7 is moved to the N pole side, the area of the one end facing the N pole of the magnet portion 6 becomes larger than the area facing the S pole of the magnet portion 6. Also, the center of one end of the second magnetic yoke 8 is moved to the S pole side and the area of the one end facing the S pole of the magnet portion 6 becomes larger than the area facing the N pole of the magnet portion 6. In this case, in the first magnetic yoke 7, after the magnetic flux outputted from the N pole of the magnet portion 6 is inputted, the magnetic flux goes through a magnetic circuit of the first magnetic ring 14, the first magnetism collecting ring 17, the first magnetism collecting yoke 19, the projections 22, 24, the magnetic sensor 25, 26, the projections 21, 23, the second magnetism collecting yoke 20, the second magnetism collecting ring 18, the second magnetic ring 15, the second magnetic yoke 8 to the S pole of the magnet portion 6 as shown in FIG. 1.

The amount of the magnetic flux detected at the magnetic sensors 25, 26 corresponds to the area of the one end of the first magnetic yoke 7 facing the N pole of the magnet portion 6 and the area of the one end of the second magnetic yoke 8 facing the S pole of the magnet portion 6. Therefore, from the amount of the magnetic flux detected at the magnetic sensors 25, 26, movement amounts of the first magnetic yoke 7 and the second magnetic yoke 8, that is, the steering torque of the steering wheel rotating the input shaft 2 can be detected.

In this way, since the first magnetic yoke 7 and the second magnetic yoke 8 are bent in the L shape so that they can guide the magnetic flux outputted from the magnetism generation portion 4 to the outer circumference side of the output shaft 3 and a magnetism detecting device provided with the magnetic sensors 25, 26 can be provided on the outer circumference side of the output shaft 3, the length of the input shaft 2 and the output shaft 3 in the axial direction can be formed short.

Also, the first magnetism collecting ring 17, the second magnetism collecting ring 18 are provided facing the first magnetic ring 14, the second magnetic ring 15 outside each of the first magnetic ring 14, the second magnetic ring 15 so as to surround the first magnetic ring 14, the second magnetic ring 15. Therefore, even if the first magnetic ring 14 and the second magnetic ring 15 are eccentric with each other, all the magnetic fluxes passing through the first magnetic ring 14 and the second magnetic ring 15 can be efficiently guided to the first magnetism collecting ring 17 and the second magnetism collecting ring 18. Moreover, since the first magnetism collecting ring 17 and the second magnetism collecting ring 18 are formed wider in the axial direction than the first magnetic ring 14 and the second magnetic ring 15, respectively, the magnetic flux having passed through the first magnetic ring 14 and the second magnetic ring 15 are more efficiently guided to the first magnetism collecting ring 17 and the second magnetism collecting ring 18.

Also, the first magnetism collecting ring 17 and the second magnetism collecting ring 18 are formed wider than the first magnetic ring 14 and the second magnetic ring 15 respectively, outside the first magnetic ring 14 and the second magnetic ring 15, respectively. Therefore, even if there is an error of positional displacement in the direction along the axis core between the first magnetic ring 14 and the first magnetism collecting ring 17 as well as the second magnetic ring 15 and the second magnetism collecting ring 18, the first magnetism collecting ring 17 can be faced with the first magnetic ring 14, and the second magnetism collecting ring 18 can be faced with the second magnetic ring 15. Therefore, a loss of the magnetic flux between the first magnetism collecting ring 17 and the first magnetic ring 14 as well as the second magnetic collecting ring 18 and the second magnetic ring 15 can be suppressed, and efficient transmission is achieved.

Also, the magnetic flux outputted from the N pole of the magnet portion 6 faced with the first magnetic yoke 7 goes through the plurality of first magnetic yokes 7, the first magnetic ring 14, the first magnetism collecting ring 17, the second magnetism collecting ring 18, the second magnetic ring 15, the plurality of second magnetic yokes 8 and in the middle of the way to the S pole of the magnet portion 6 faced with the second magnetic yoke 8, it goes through the magnetic sensors 25, 26, being concentrated with a high density between the projections 22, 24 of the first magnetism collecting yoke 19 and the projections 21, 23 of the second magnetism collecting yoke 20. Thus, the magnetic sensors 25, 26 can detect change in the magnetic flux with operation of the steering wheel efficiently and with high accuracy.

Figure 4:
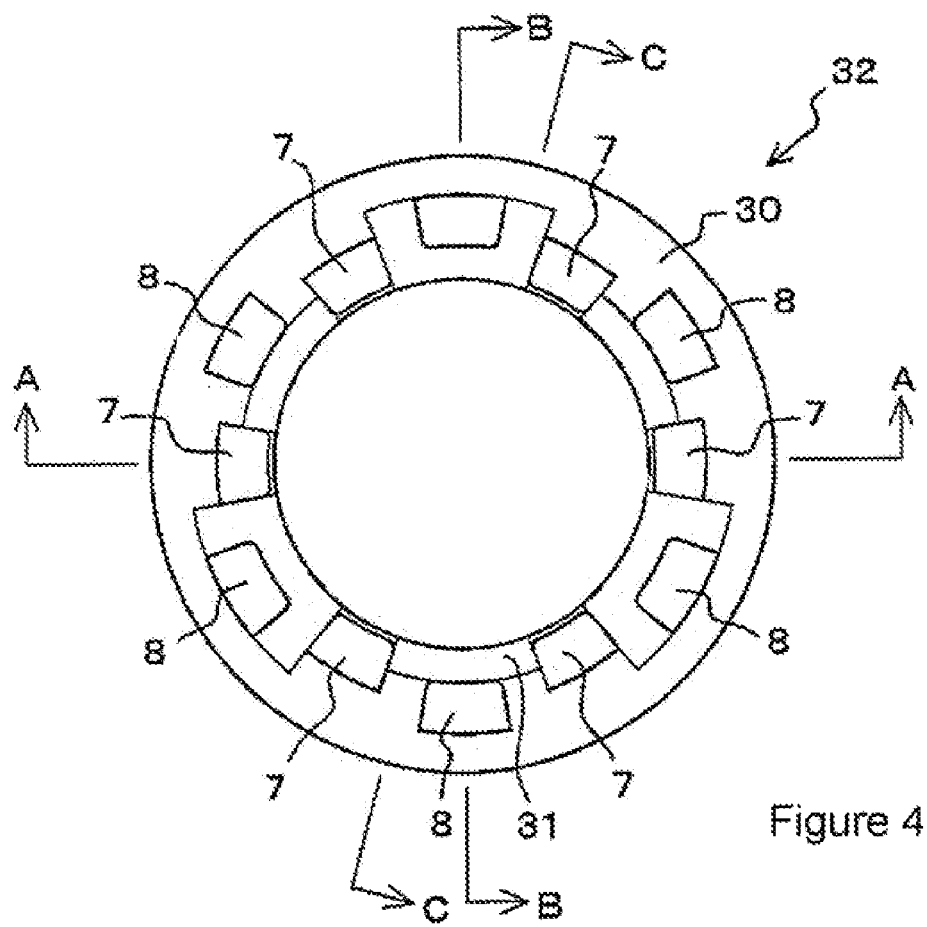
FIG. 4 is an end face view in a state where a first magnetic yoke, a second magnetic yoke, a first magnetic ring and a second magnetic ring are molded to a resin and a sleeve is assembled thereto.
Figure 5:
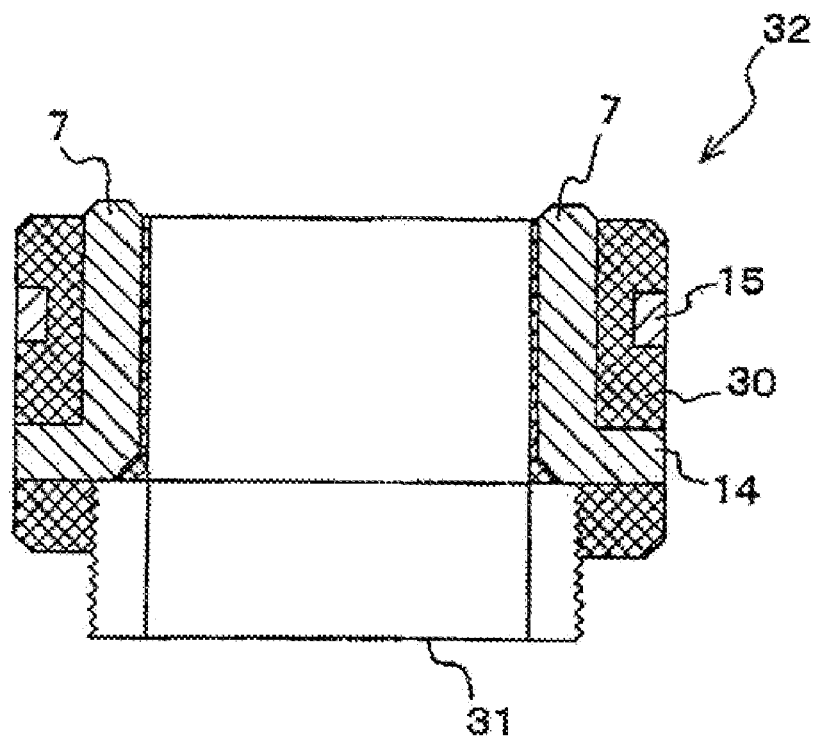
FIG. 5 is an A-A sectional view of FIG. 2.
Figure 6:
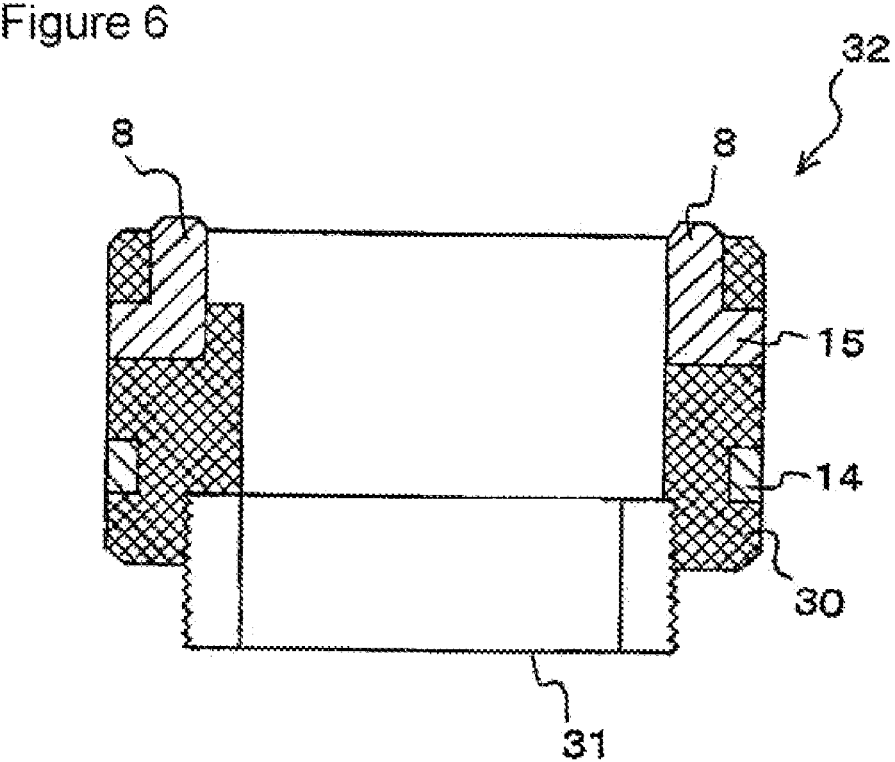
FIG. 6 is a B-B sectional view of FIG. 2.
Figure 7:
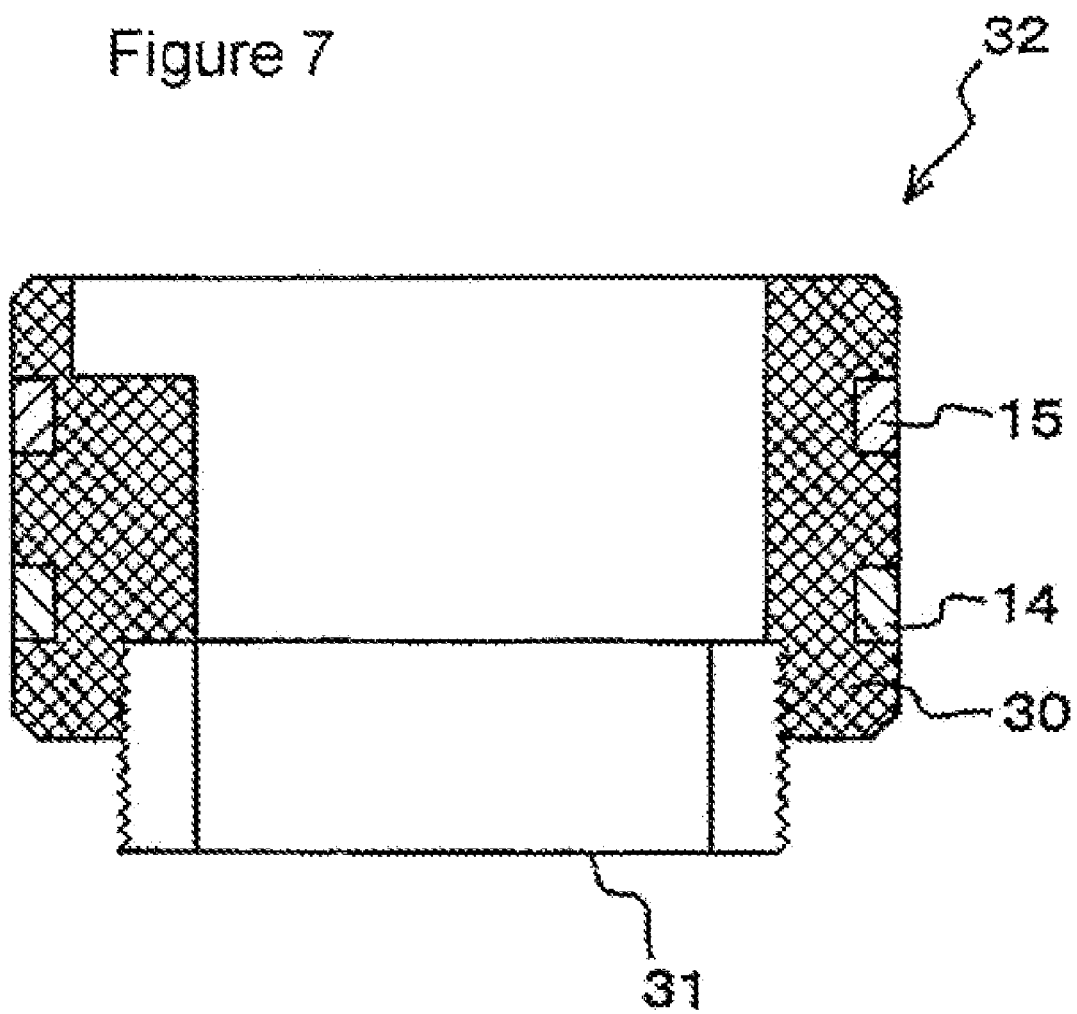
FIG. 7 is a C-C sectional view of FIG. 2.

FIGS. 4 to 7 show a sleeve assembly 32 in which a sleeve 31 is provided at a yoke mold body 30 where the first magnetic yoke 7, the second magnetic yoke 8, the first magnetic ring 14 and the second magnetic ring 15 are molded to a resin. FIG. 4 shows an end face view of the sleeve assembly 32, FIG. 5 shows an A-A sectional view of FIG. 4, FIG. 6 is a B-B sectional view of FIG. 4 and FIG. 7 is a C-C sectional view of FIG. 4.

As shown in FIGS. 5 to 7, the sleeve 31 is in the shape inserted into the yoke mold body 30 from the tip end side and the rear end side of the sleeve 31 is constructed so that the yoke mold body 30 is exposed to the outside. The sleeve 31 is, as will be described later, press-fitted into the output shaft 3 when the sleeve assembly 32 is assembled to the output shaft 3.

As mentioned above, since a resin is not provided on the outer circumference of the rear end side of the sleeve 31, there is no fear that the resin is damaged even if the diameter of the sleeve 31 is expanded at press fitting of the sleeve 31 into the output shaft 3, and moreover, the force to expand the diameter of the sleeve 31 is rarely left as a stress in the resin.

In the above embodiment shown in FIG. 1, the desired object of the present invention can be achieved even after the first magnetism collecting ring 17, the second magnetism collecting ring 18, the first magnetism collecting yoke 19 and the second magnetism collecting yoke 20 are deleted, a space between the first magnetic ring 14 and the second magnetic ring 15 is made as a magnetic gap and the magnetic sensors 25, 26 are provided in the magnetic gap.

However, when it is constructed as in the above described manner in the embodiment shown in FIG. 1, the following working effect is exerted. When the first magnetism collecting ring 17, the second magnetism collecting ring 18 are not provided but the magnetic gap is provided between the first magnetic ring 14 and the second magnetic ring 15 so as to detect the magnetic flux in the magnetic gap by the magnetic sensors 25, 26, if the first magnetic ring 14 and the second magnetic ring 15 are not assembled in parallel with each other with high accuracy, an interval of the magnetic gap is changed due to change in the width of the clearance between the first magnetic ring 14 and the second magnetic ring 15 with rotation of the input shaft 2 and the output shaft 3, detection of the magnetic flux is affected. That is, due to influence of an error in assembling of the first magnetic ring 14 and the second magnetic ring 15, magnetic detection of the rotation of the output shaft 3 with respect to the input shaft 2 with accuracy becomes difficult.

On the other hand, in the above embodiment shown in FIG. 1, outside the first magnetic ring 14 and the second magnetic ring 15, the first magnetism collecting ring 17 and the second magnetism collecting ring 18 are provided in the housing H, respectively, the first magnetism collecting yoke 19 and the second magnetism collecting yoke 20 are provided at the first magnetism collecting ring 17 and the second magnetism collecting ring 18, and two pairs of projections 21 to 24 are provided at the first magnetism collecting yoke 19 and the second magnetism collecting yoke 20 so that spaces between these two pairs of the projections 21 to 24 are made as the magnetic gaps, and the first magnetism collecting ring 17 and the second magnetism collecting ring 18 are mounted to the housing H and fixed. Therefore, the interval of the magnetic gap is not affected by rotation of the input shaft 2 and the output shaft 3 but constant. That is, in the case of the above embodiment shown in FIG. 1, not affected by the rotation of the input shaft 2 and the output shaft 3, detection can be made while reducing an error of the steering force of the steering wheel.

Figure 8:
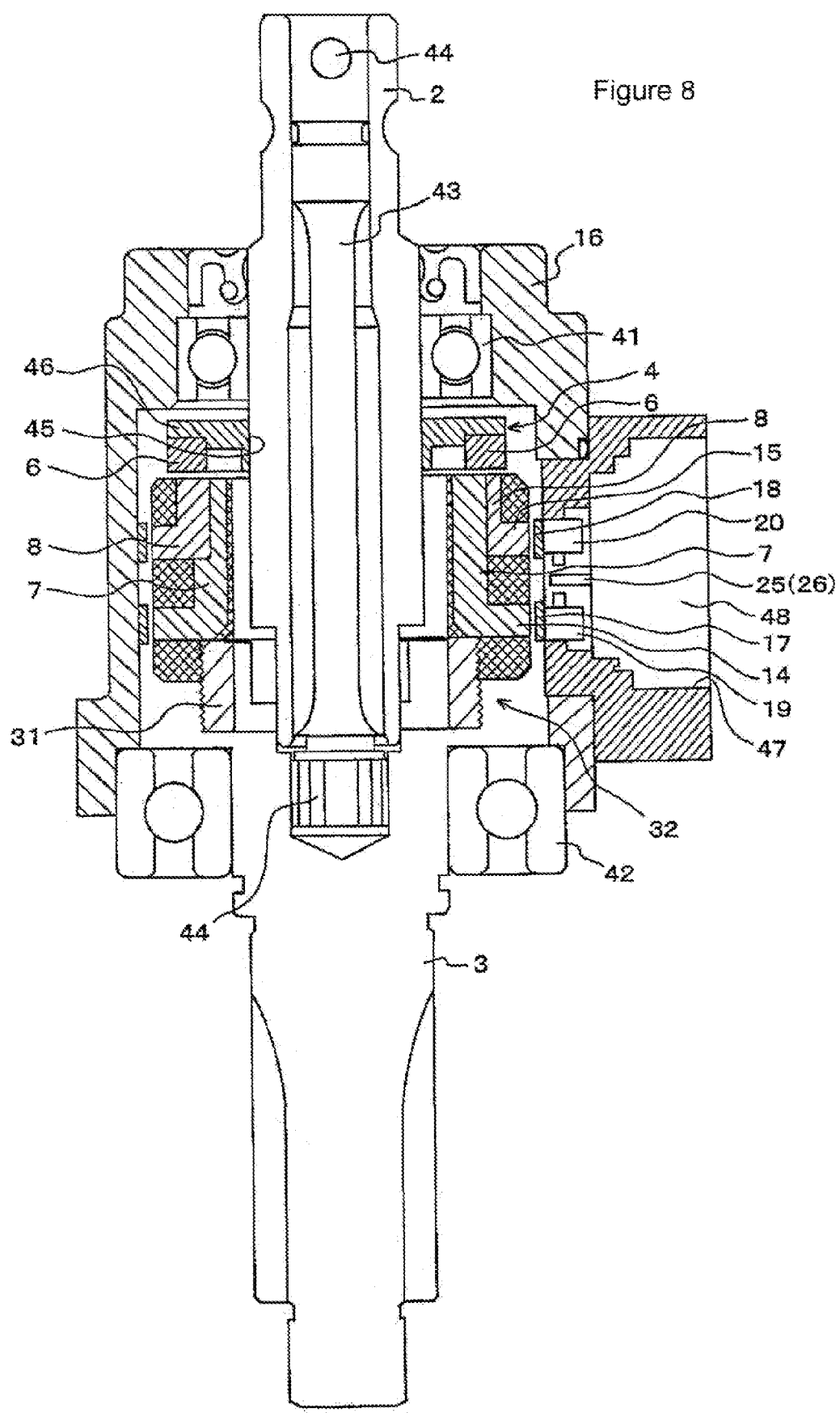
FIG. 8 is a longitudinal sectional view of an electric power steering device.
Figure 9:
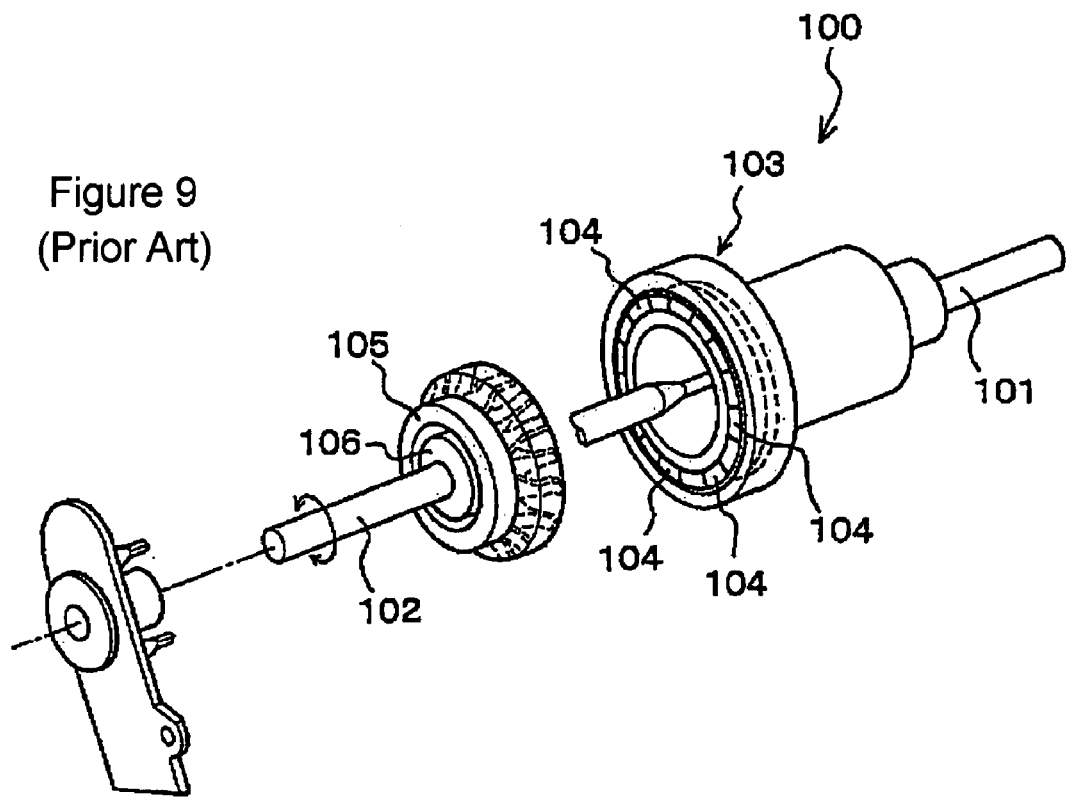
FIG. 9 is a perspective view of the vicinity of a torque sensor (conventional art)
Figure 10:
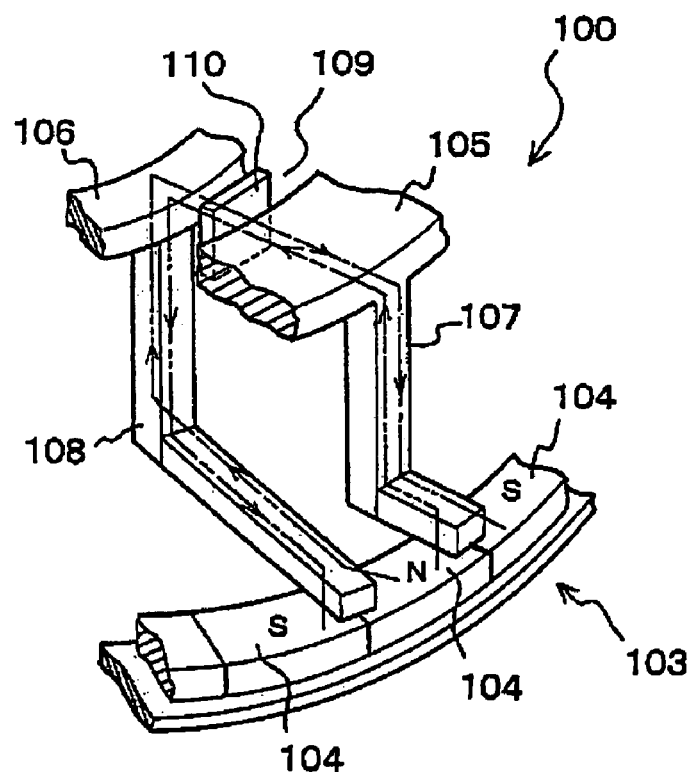
FIG. 10 is a partial enlarged view of FIG. 7 (conventional art)
Figure 11:
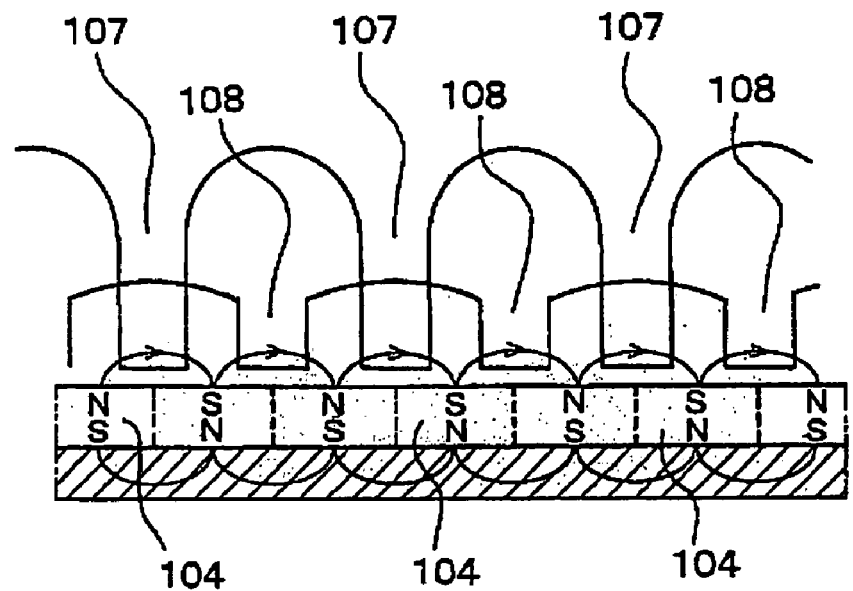
FIG. 11 is a diagram for explaining action (conventional art)
Figure 12:
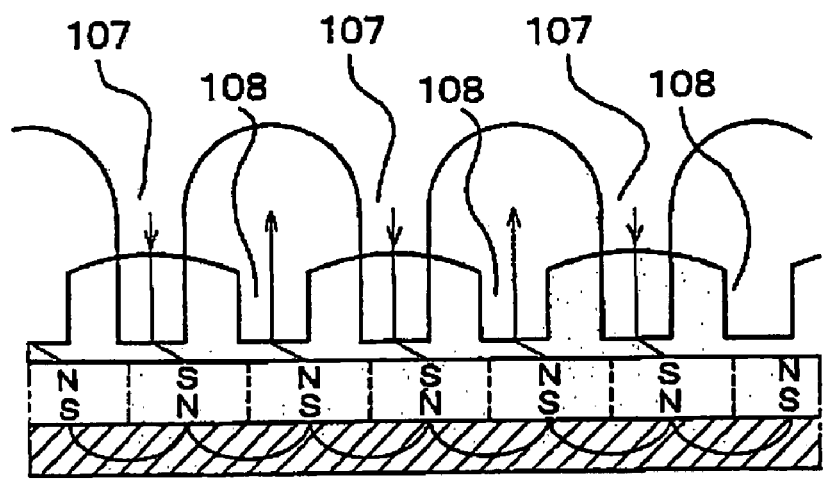
FIG. 12 is a diagram for explaining action (conventional art).

FIG. 8 shows a longitudinal sectional view of an electric power steering device 40 incorporating the above torque sensor 1. In the housing H, the input shaft 2 and the output shaft 3 are arranged vertically, and the input shaft 2 and the output shaft 3 are rotatably supported in the housing H by bearings 41, 42. The input shaft 2 is formed in the cylindrical shape, and a torsion bar 43 is arranged inside. The torsion bar 43 is connected to the input shaft 2 by a pin 44 at the upper end.

The lower end side of the torsion bar 43 is connected to the output shaft 3 through a serration 44.

To the input shaft 2, the magnetism generation portion 4 is mounted. The magnetism generation portion 4 is provided with a back yoke 46 formed with a shaft insertion hole 45 at the center and formed from an annular magnetic body and the magnet portion 6 attached to the back yoke 46. The back yoke 46 is a member formed from a magnetic body and functioning as a magnetic path.

Also, at the output shaft 3, the sleeve assembly 32 is press-fitted and mounted. The sleeve assembly 32 is assembled to the upper end of the output shaft 3 so that the sleeve 31 is press-fitted to the upper end of the output shaft 3. The sleeve 31 is formed by a non-magnetic body so that the magnetic flux generated at the magnetism generation portion 4 does not leak to the output shaft 3 side.

As shown in FIG. 8, in the state where the sleeve assembly 32 is assembled to the output shaft 3, one ends of the first magnetic yoke 7 and the second magnetic yoke 8 are faced with the magnet portion 6 of the magnetism generation portion 4 with a slight gap between them.

On the inner face of the housing H, the first magnetism collecting ring 17 and the second magnetism collecting ring 18 are attached. The first magnetism collecting ring 17 is formed wider than the first magnetic ring 14 and faced with the first magnetic ring 14. The second magnetism collecting ring 18 is formed wider than the second magnetic ring 15 and faced with the second magnetic ring 15.

In the housing H, a magnetism detecting device mounting hole 47 is formed, and a magnetism detecting device 48 is attached to the magnetism detecting device mounting hole 47. The magnetism detecting device 48 is provided with the magnetic sensors 25, 26 and incorporates a calculation portion and the like for calculating a magnetic flux amount based on the outputs of the magnetic sensors 25, 26.

In the magnetism detecting device mounting hole 47, the first magnetism collecting yoke 19 is mounted to the first magnetism collecting ring 17. Also, the second magnetism collecting yoke 20 is mounted to the second magnetism collecting ring 18. At the first magnetism collecting yoke 19 and the second magnetism collecting yoke 20, the projections 21, 23, 22, 24 (shown in FIG. 1) are provided so that they are opposed to each other. Between the projections 21, 23, 22, 24 opposed to each other, the magnetic sensors 25, 26 are arranged.

In the above description, the case where the torque sensor 1 is applied to the electric power steering device 40 has been described, but not limited to the electric power steering device 40, it can be widely applied for detection of a torque between two shafts.

What is claimed is:

1. A torque sensor comprising a housing, a first shaft and a second shaft accommodated in the housing and connected coaxially by a torsion bar, and a magnetism generation portion attached to the first shaft so as to surround the outer circumference of the first shaft and outputting a magnetic flux in the axis core direction of the first shaft, in which a plurality of magnetic yoke portions comprising a first magnetic yoke and a second magnetic yoke for guiding the magnetic flux outputted from the magnetism generation portion are attached to the second shaft; and a torque between the first shaft and the second shaft is detected magnetically by a magnetic sensor through detection of the magnetic flux in a magnetic gap between the first magnetic yoke and the second magnetic yoke, wherein the first magnetic yoke and the second magnetic yoke have their one end opposed to the magnetism generation portion, respectively, and the first magnetic yoke and the second magnetic yoke are bent in the L shape in the middle and extended in the direction crossing the axis core of the second shaft, respectively, and the other ends of the first magnetic yoke and the second magnetic yoke are provided separately from each other in the axis core direction on the outer circumference side of the second shaft;

the other ends of the first magnetic yokes of each magnetic yoke portion are connected to each other by a first magnetic ring;

the other ends of the second magnetic yokes of each magnetic yoke portion are connected to each other by a second magnetic ring; and the magnetic sensor is provided in the magnetic gap between the first magnetic ring and the second magnetic ring.

2. The torque sensor, wherein a first magnetism collecting ring is provided opposite to the first magnetic ring in the housing;

a second magnetism collecting ring is provided opposite to the second magnetic ring in the housing; and a magnetic gap forming portion for forming the magnetic gap is provided between the first magnetism collecting ring and the second magnetism collecting ring.

3. The torque sensor according to claim 2, wherein the first magnetism collecting ring is provided wider than the first magnetic ring and the second magnetism collecting ring is provided wider than the second magnetic ring.

4. The torque sensor according to claim 2 or 3, wherein the magnetic gap forming portion is provided with a first magnetism collecting yoke connected to the first magnetism collecting ring, a second magnetism collecting yoke connected to the second magnetism collecting ring, and two pairs of projections provided at the first magnetism collecting yoke and the second magnetism collecting yoke, wherein each magnetic gap is made between these two pairs of the projections and each magnetic sensor is provided in each magnetic gap.

* * * * *